United States Patent Office 3,407,449
Patented Oct. 29, 1968

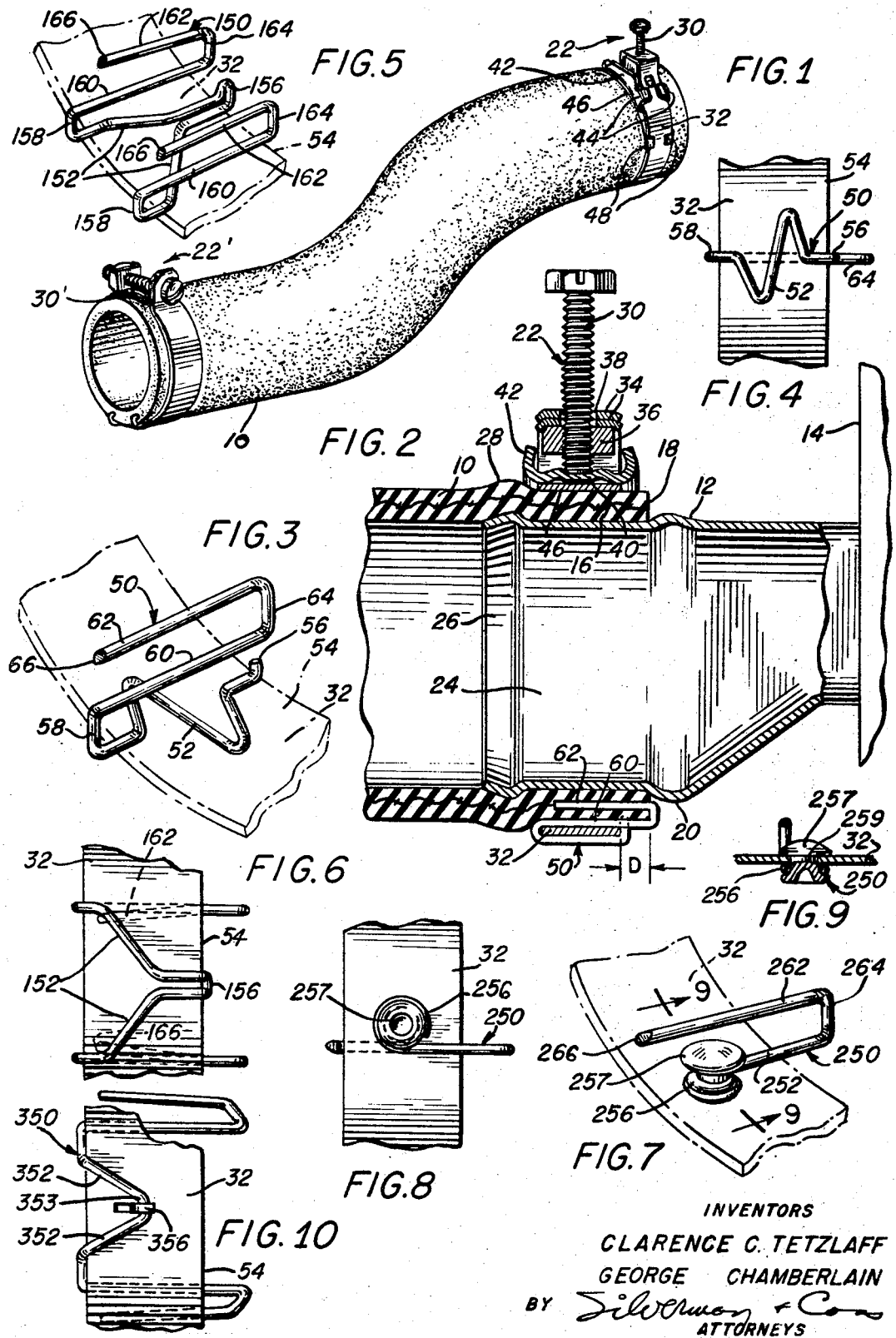

3,407,449
HOSE CLAMP WITH HOSE-ATTACHING MEANS
Clarence C. Tetzlaff, River Forest, and George Chamberlain, Cicero, Ill., assignors to Wittek Manufacturing Co., Chicago, Ill., a corporation of Illinois
Filed Mar. 3, 1967, Ser. No. 620,473
20 Claims. (Cl. 24—19)

ABSTRACT OF THE DISCLOSURE

A hose clamp of the type which has a metal strap or band adapted to be constricted about a hose to secure the hose to a pipe by taking up a screw in a conventional manner, in which there is a wire clip or bracket secured to the hose clamp, the clip having at least one reverse-bent tine or prong that extends laterally of the band and forms a bight spaced laterally of the band edge; the clamp adapted to be pre-positioned on the hose and secured thereto by piercing the axial end wall of the hose and pushing the prong into the end wall until the hose end bottoms in the bight, thereby spacing the clamp properly from the hose end as well as securing it in place.

Cross-reference to related applications

A hose clamp with hose-attaching means of a structure which enables the hose clamp properly to be secured to and positioned relative to the end of a hose is disclosed in a co-pending application filed by the applicants as named herein and identified as follows:

George Chamberlain and Clarence C. Tetzlaff application Ser. No. 620,472, filed Mar. 3, 1967, and having the same title as this application.

The principal difference between the invention of the above identified co-pending application and the invention herein lies in the use of a wire clip or bracket herein with prongs that pierce the axial end of the hose in this case. In the co-pending application the spacing and securing means is formed of sheet metal and includes prongs or tines which engage about the end of the hose when the clamp is properly mounted, entering the interior of the hose and adapted to pierce the inside wall of the hose, entering the same radially. Other aspects of the structures differ.

In the description of the invention herein, reference will be made to a radial screw type of hose clamp which uses a load-diffusing member, and this hose clamp is disclosed in a second co-pending application identified as follows:

Clarence C. Tetzlaff application Ser. No. 447,014, filed Apr. 9, 1965, and entitled Hose Clamp With Load Distributing Member. Clarence C. Tetzlaff named in the second co-pending application is one of the applicants in the first co-pending application and in this one.

Both of the above applications as well as this one are owned by a common assignee.

The second co-pending application is identified only as reference for the details of one hose clamp described generally herein, such details not being necessary for an understanding of the invention herein.

Background of the invention

The invention herein relates to the hose clamp art and specifically is directed to a hose clamp which has some form of structure which provides means for properly spacing a hose clamp relative to the end of a hose while at the same time securing the clamp to the hose so that the clamp may be secured to a length of hose before assembly of the length of hose with attached clamps to the apparatus with which it is to be used, such as the cooling system of an internal combustion engine, for example. This statement of the field of the invention is applicable also to the invention disclosed and claimed in the first identified co-pending application Ser. No. 620,472 mentioned above.

The invention herein is applicable to hose clamps of the type which have bands as their tension members as opposed to wires, and as such the basic hose clamp which is modified in accordance with the invention could be any of the many band-type hose clamps, such as for example those disclosed in U.S. Patents 1,584,332, 2,278,337, 2,321,930 and 3,086,270. An example of a wire hose clamp is disclosed in U.S. Patent 492,855. None of these, however, disclose spacing and securing structure. Band type hose clamps which may be modified in order to achieve the invention include both radial and tangential types.

In an effort to render the production line assembly of hoses to engines foolproof, in recent times manufacturers have specified stapling of the clamps to hose ends. Since jigs or fixtures are provided for this operation, the clamps are properly spaced from the ends of the hose and the take-up screws or nuts are properly oriented circumferentially of the hose for ease of assembly and accessibility. The workman is given a quantity of hose lengths of proper shape and dimension with the clamps already secured in place. He mounts each assembly between the proper spuds or pipe ends and, providing the hose lengths are correctly cut and shaped and likewise have the clamps properly secured and positioned, the workman need only tighten the clamps. Theoretically this procedure eliminated the need for placing the clamps on the hose ends on the engine assembly line, spacing them properly from their respective ends and orienting them circumferentially to a desired location. Any or all of these steps could provide a source of error in judgment, resulting in breakage, leakage, destruction of parts, waste, etc.

The type of hose clamp which has been used thus far is that disclosed in U.S. Patent 492,855 mentioned above, this being a wire type or modification thereof, enabling the staple or staples to pass on opposite sides of the wire or wires and bite into the hose.

The reason that the advantages of stapled hose clamps were above categorized as attained "theoretically" is because many problems have developed out of the use of wire hose clamps stapled to lengths of hose. Wire hose clamps provide less pressure area than band type clamps; are easily shifted from stapled position during handling prior to use unless many staples are used; have a tendency to leak due to the piercing of the walls radially in the pressure areas; in all cases use tangential tightening instrumentalities and hence usually are not amenable to high torque application without distortion and/or breakage; and bite into soft hose destructively.

The invention solves these problems and provides additional advantages which will be indicated below.

Summary of the invention

The invention is characterized by the provision of a band type of hose clamp with either a radial or tangential tightening screw, in which means are provided to enable the hose clamp to be secured to the end of a length of hose in proper position to be utilized with a pipe end or spud to which the hose is secured. The means comprise a wire bracket or clip which is secured to the hose clamp by any suitable means, such as for example rivets or lugs or straddling structure, having one or more prongs which extend laterally of the band edge. Each prong has a sharp end formed on a reverse-bent extension of the prong, with an intervening bight, the bight being spaced laterally of the edge of the hose clamp bend by a distance which is that which it is desired to space the hose end. In use, the loose clamp is slipped over the hose end and moved axially until the sharp ended extension engages the axial end of the hose, after which this sharp end is pushed into the hose wall in an axial movement until the hose end encounters the bight. The hose clamp is now secured to the hose and spaced from the hose end by the distance between the bight and the band edge.

The primary object of the invention is to provide a hose clamp which is adapted to be secured to a hose end in proper position without providing the disadvantages of the stapled wire hose clamps.

More specifically, the invention contemplates a hose clamp secured as stated in the object above which is of the band type, hence providing a substantial pressure area; a hose clamp which, when secured to the hose will not shift during handling because of the large engagement area and the novel method of securing the clamp to the hose end with the said end firmly engaged in one or more wire bights; a hose clamp in which the walls of the hose are not pierced in the area of applied pressure; a hose clamp which may be of the radial screw type enabling the application of substantial tightening torque.

Other objects of the invention are to provide a novel hose clamp of the type described above in which there is a simply formed wire clip or bracket of small size and light weight secured to one or more suitable places on the band of said hose clamp; to provide novel means for securing different types of clips or brackets; to provide a bracket or clip for the purposes described which is not removable from the finally mounted hose clamp and hose without destruction thereof, but readily removed for re-use when the hose is disassembled from its installed condition.

In connection with the last named clause of the object mentioned immediately above, it is pointed out that stapled hose clamps are not easily re-used or re-installed because, in order to remove them from the hose after they have been installed, one must pull the staples out of the hose wall from the outside, thereby tearing the hose and destroying the staples. This is true even if the hose is detached from the engine or the like. The structure of the invention is readily removed from the detached hose simply by pulling the hose clamp off the end of the hose. When installed, the hose clamp of the invention cannot be removed by something hooking onto the wire clip because the reverse-bent portion of the clip is clamped under the band and is held tightly. Any attempt to remove the clamp or clip would require great effort and surely sufficient effort to destroy the entire installation. On the other hand, the staples are engaged into the hose alongside of the wires and not likely to be bent under the wires. Accordingly, they are not clamped in position by the wires, and even if they were would readily slip past the wires. Any simple member which should hook onto or press laterally against the staple would readily pull the same out, leaving holes in the hose, irrespective of whether the hose and clamps are fully installed or not.

Other advantages and objects will become apparent from the description of the preferred embodiments which follows, in connection with which the attached drawing provides illustrations of the same. The same characters of reference will be used where practical to designate the same or equivalent structural elements or components.

Brief description of the drawing

FIG. 1 is a perspective view of a length of hose of relatively flexible material having hose clamps of different design secured at the respective ends of the hose and properly spaced therefrom, but both hose clamps being of the construction of the invention.

FIG. 2 is a median sectional view of a hose clamp of the construction of the invention securing a hose end to a spud, the clamp being of the type described in detail in the second co-pending application Ser. No. 447,014 mentioned above.

FIG. 3 is a perspective view of one form of wire clip adapted to be mounted to the band of a hose clamp, a fragment of such band being shown in phantom perspective to illustrate the manner of attachment.

FIG. 4 is a bottom plan view of a fragment of a hose clamp having the clip of FIG. 3 secured thereto.

FIG. 5 is a view similar to that of FIG. 3 but showing another form of the invention.

FIG. 6 is a view similar to that of FIG. 4, but showing the clip of FIG. 5 secured to the hose clamp band.

FIG. 7 is a view similar to that of FIG. 3, but illustrating another modification of the invention.

FIG. 8 is a view similar to that of FIG. 4 but showing the clip of FIG. 7 secured to the hose clamp band.

FIG. 9 is a fragmentary sectional view taken generally along the line 9—9 of FIG. 8 and in the direction indicated.

FIG. 10 is a view similar to that of FIG. 6 but illustrating still another form of the invention.

Description of the preferred embodiments

As previously stated the invention is characterized by the provision of a wire clip or bracket secured to the flat band of the hose clamp and providing a return-bent prong or plurality of prongs each having a bight spaced axially from the edge of the hose clamp and a sharp extension adapted to enter the axial end of the wall of the hose for securing the hose clamp in place. The axis of a hose clamp is presumed coincident with the axis of the cylinder defined by its band.

FIG. 1 is a perspective view of a typical hose 10 of the type normally used in automobile and truck engines. These hoses are normally formed of a rubber-like material reinforced with fabric, wire and sometimes having preformed spring supports on the interior thereof. Since most internal combustion engines of today are manufactured on high speed production lines, heretofore hoses, such as the hose 10 are cut to length and shaped if necessary and furnished to the workmen on the line to assemble between a pair of pipe ends or spuds. The workman in the past has had a plurality of hose clamps and in the installation of the hose it was necessary for him to mount a hose clamp on each end, secure the hose 10 to the spud at both ends, adjust the clamp to the proper position and tighten it.

The above described procedure depends upon judgment and skill of the workman and hence furnishes a source of trouble. The hose clamp must be spaced properly from the end of the hose in order to engage properly the pipe ends so that the necessary pressure may be applied and likewise must be oriented circumferentially of the hose so that the fastening device is accessible after the engine has been assembled. For example in FIG. 2 the hose 10 is shown secured to a sheet metal spud 12 which in turn is mounted on some part of the vehicle engine such as for example a radiator wall 14. The wall 16 of the hose adjacent its axial end 18 is readily telescoped over the end of the spud 12 at the bead 20 but the location of the hose clamp 22 is not as easily assured. For best securement it is essential that the hose clamp be mounted so that the pressure is applied at the annular cylindrical area 24. It can be seen that if the hose clamp 22 is mounted by the workman either on the end bead 26 or even to the left thereof as viewed in FIG. 2 the securement will be faulty. Although the bulge 28 resulting from the end bead 26 is quite obvious in the drawing this is not always so especially where the bead 26 is very small, and/or the hose 10 has very thick resilient walls, and/or there is no end bead 26.

Accordingly the invention herein provides a hose clamp which properly spaces the hose clamp from the axial end 18 of the hose thereby assuring its securement over the pressure area 24 and likewise assuring proper orientation of the fastening instrumentality of the hose clamp, as will be described.

In FIG. 1 two hose clamps are illustrated at opposite ends of the hose 10, the right hand hose clamp 22 being of the construction shown in detail in FIG. 2 and referred to in co-pending application Ser. No. 447,014. At the left hand end of the hose 10 is illustrated another hose clamp 22' which is of a somewhat different construction. The hose clamp 22 has a radial screw 30 for tightening the same whereas the hose clamp 22' has the tangential screw 30' for tightening the same. It is most unlikely that two different kinds of hose clamps would be used on a length of hose such as the hose 10, but the purpose of the illustration is to indicate that the invention is applicable to any type of hose clamp which has a flat band as its tension member. After the length of hose 10 with its hose clamps has been assembled to an engine it is important that the tightening screws 30 or 30' be accessible in such a manner that they can be removed or replaced if desired.

According to the invention the hose 10 is provided with the hose clamps fully attached although not tightened, and is properly spaced from the free ends to that when the workman mounts the hose to the spuds such as the spud 12 all that he need do is tighten the screws and the hose clamps will properly be attached.

The hose clamp 22 has a flat tension band 32, the free ends of which overlap to provide a rectangular formation as shown at 34 whose purpose it is to confine a square nut 36. The overlapped band ends 34 are perforated so that the radial screw 30 may freely pass through the perforations 38, being threaded upon the nut. The lower axial end of the screw 30 is seated in a thrust socket 40 formed in the saddle or bridging member 42, the ears 44 of which confine and guide the band 32 as the hose clamp is constricted by taking up on the screw 30.

This is a known form of hose clamp and operates by raising the nut 36 and thereby pulling the overlapped ends 34 through the bent-over ears 44 of the saddle member 42.

The hose clamp 22 in this case utilizes a load distributing member 46 which is loosely secured beneath the saddle 42 and has its ends slidably engaged to the band 32 by suitable lugs 48 integral with the load distributing member 46.

A wire clip or bracket is secured to the band 32 preferably spaced from the bridge or saddle member 42. Four different types of such clips are illustrated in detail in FIGS. 3-10. Any one of these clips or brackets may be combined with the hose clamps 22 or 22' for securement purposes.

FIGS. 3 and 4 illustrate one form of clip 50 in which the single length of wire is suitably bent to form the clip. On the outside surface of the band 32 a substantially Z-shaped formation comprising a support portion 52 has one end hooked to the edge 54 by the formation 56. The other end continues in a reverse bend 58 to the inside surface of the band 32. An elongate integral portion 60 and a free-ended extension 62 joined by the bight 64 form the prong which has previously been referred to, the end 66 being pointed. The length of the portion 60 is such that the bight 64 is spaced from the edge 54 of the band 32 properly to position the hose clamp of which the band 32 forms a part, from the hose end.

In use, the hose clamp is slipped over the free end of the hose 10 and (as it telescopes upon the hose, the sharp end 66 engages the axial end 18 of the wall 16 and pierces the same. The free-ended extension 62 is pushed as far as it can go which is determined by the spacing of the bight 64 from the edge 54 of the band 32. This distance is designated D in FIG. 2 and is controlled by manufacturing the clip 50 of suitable dimensions.

The hose clamp, such as 22, with its properly positioned clip 50 is mounted to the hose 10 in a fixture so that the workman has nothing to do but insert the hose on the spud 12 and tighten the screw. The band 32 will lie exactly as desired in accordance with the design of the clip 50 and the screw will properly be oriented relative to the circumference of the hose.

In the embodiment of FIGS. 3 and 4 as well as in that shown in FIGS. 5 and 6, the location of the clip along the length of the band 32 depends on a frictional engagement. Other means for locating the clip will be described in connection with FIGS. 7-10.

Referring now to FIGS. 5 and 6 the clip 150 consists primarily of two parts each of which is the equivalent of the clip 50. Thus, each half has an angled support portion 152 overlying the outside of the band 32 and joining to form the hook 156 engaging the edge 54 of the band 32. Each half has a reverse bend 158 connecting the inside straight portions 160 with their respective bights 164 and free-ended extensions 162 having the sharpened ends 166. The hose clamp having the clip 150 is used in exactly the same manner as described in connection with the clip 50 except that in this case there are two prongs each having a sharpened end, which enter the axial end 18 of the wall 16 of the hose 10 at locations substantially spaced apart circumferentially.

The clip 250 illustrated in FIGS. 7, 8 and 9 has a straight support portion 252 overlying the outside surface of the band 32 and an eye 256 formed at the end of said straight support portion 252. A rivet 257 engages through the eye 256 and a suitable perforation 259 in the band 32 to secure the clip 250 in place.

As seen, the clip 250 is quite simple with the bight 264 and the free end extension 262 with its sharpened end 266 providing the same functions as those equivalent parts of the clip 50 of FIGS. 3 and 4.

In the case of the clip 350 illustrated in FIG. 10 it differs from the clip 150 only in that there is no hook portion 156. Instead the support legs 352 provide a simple bend 353 that is engaged beneath a tongue 356 struck from the body of the band 32 to hold the clip 350 in place. In all other respects the clip 350 is the same as the clip 150.

From the discussion above it will become apparent that the spacing of the hose clamp from the end 18 of the hose is achieved by proper dimension of the reverse-bent prongs of the respective clips thereby adjusting the dimension D of FIG. 2. The hose clamp in each case is fixed against movement relative to the hose by the piercing of the sharp free-ended extension or extensions axially into the end 18 of the hose, such extensions entering the wall portion 16 of the hose. Noting FIG. 2, it will be seen that both the straight portion 60 and the free-ended extension 62 are located between the band 32 and the pressure portion 24 of the spud 12 so that when the hose clamp is tightened these two parts will be frictionally held in place. Thus the hose clamp is not readily removed after the screw 30 has been tightened, and provides a durable, secure joint.

What it is desired to secure by Letters Patent of the United States is:

1. A hose clamp having a flat, generally circular tension band, means for securing said hose clamp to a hose at a predetermined location spaced from an end of the hose, comprising spacing and securing means connected with said clamp and extending laterally of the band edge in an axial direction, said spacing and securing means having a reverse bend therein to form a bight axially spaced laterally outward from said band edge, said spacing and securing means having two parts, one part being connected between the bight and clamp and the second part being a continuation of the bight and having a piercing end, the hose clamp adapted to be telescoped over an end of the hose with an axial end face of the hose engaged in the bight and the piercing end inserted axially into the hose wall.

2. The structure as claimed in claim 1 in which the spacing and securing means comprise a wire member having a support portion overlying the outside of the band and being secured thereto.

3. The structure as claimed in claim 2 in which the support portion is frictionally engaged to the band.

4. The structure of claim 2 in which the support portion is substantially permanently attached to the band.

5. The structure of claim 2 in which said support portion comprises a pair of branches and each branch has a bight and a piercing end connected therewith so as to provide spaced apart plural engagements of the hose end with said bights as well as spaced apart insertions of the piercing ends into said wall when the clamp is secured to the hose.

6. The structure as claimed in claim 2 in combination with and secured to a length of hose.

7. The structure of claim 1 in which the spacing and securing means comprise a wire member having a support portion hooked frictionally between opposite edges of the band.

8. The structure of claim 1 in which the spacing and securing means comprise a wire member and said second part comprises at least one straight tine adapted to enter the axial face of the hose and pass axially into the wall of the hose.

9. The structure of claim 8 in which the tine is substantially longer than the distance from the bight to the adjacent edge of the band whereby the tine enters the hose wall radially inward of the band when the clamp is secured to the hose.

10. The structure of claim 8 in which said wire member has two tines spaced apart and both are adapted to enter the said axial end face and pass into said wall at circumferentially spaced apart locations.

11. The structure of claim 8 in which said wire member has an undulated support portion defining a plane and the support portion is engaged to said band.

12. The structure of claim 11 in which said support portion has two such second parts spaced from one another.

13. The structure of claim 12 in which such undulated support portion has a generally V-shaped form and means are connected between the apex of the V and the band to attach the spacing and securing means to the band.

14. The structure of claim 1 in which the spacing and securing means comprise a wire member having means for clipping same to said band and providing two prongs spaced apart, each prong having a bight and a piercing free end.

15. The structure as claimed in claim 1 in combination with and secured to a length of hose.

16. A clip adapted to be secured to a hose clamp having a flat tension band member for locating said hose clamp relative to a hose end and securing said clamp to said hose prior to using the hose, comprising: an integral bent wire member having an undulated support portion defining a plane and adapted to engage against the outside surface of said band member, a prong connected to said support portion and having a reverse bend therein forming a bight, and a piercing tine connected to said bight and extending from said bight toward said support portion and generally disposed in a plane parallel to that of said support portion.

17. The clip of claim 16 in which said wire member has two branches providing a pair of spaced apart prongs each having its own bight and piercing tine, and both tines lying in said plane parallel to that of said support portion.

18. In a hose clamp having a flat tension band and means for securing said hose clamp to a hose axially spaced inwardly of an end of the hose, said securing means comprising a wire clip secured to said band and having a reverse bend prong including a free-ended sharp member spaced radially inward of the band and a bight spaced axially away from an edge of the band by a predetermined amount, the hose clamp adapted to be installed on said hose end with the extension pierced into the wall of the hose from the axial end thereof and extending axially within said wall, with the said axial end of the hose engaged against said bight.

19. The structure as claimed in claim 18 in which said wire clip has a pair of said prongs each having one of said free-ended sharp members adapted to be pierced into the hose wall as aforesaid at circumferentially spaced locations.

20. A hose clamp having a flat, generally circular tension band, means for securing said hose clamp to a hose at a predetermined location spaced from an end of the hose, comprising spacing and securing means connected with said clamp and extending laterally of the band edge in an axial direction, said spacing and securing means having a reverse bend therein to form a bight axially spaced laterally outward from said band edge, said spacing and securing means having two parts, one part being connected between the bight and clamp and the second part being a continuation of the bight and adapted piercingly to engage an axial end of said hose, the hose clamp adapted to be telescoped over an end of the hose with an axial end face of the hose engaged in the bight and the said second part piercingly engaging said hose end to fix the position of said clamp thereon.

References Cited

UNITED STATES PATENTS

| | | | |
|---|---|---|---|
| 1,012,345 | 12/1911 | Ferguson. | |
| 1,426,086 | 8/1922 | Lowrey | 285—253 XR |
| 2,208,706 | 7/1940 | Spencer | 285—253 XR |
| 2,451,062 | 10/1948 | Booth | 24—279 XR |
| 3,365,218 | 1/1968 | Denyes | 285—253 |

DONALD A. GRIFFIN, *Primary Examiner.*